(12) United States Patent
Foster et al.

(10) Patent No.: US 7,285,043 B2
(45) Date of Patent: Oct. 23, 2007

(54) CONCAVE FOR A COMBINE HARVESTER

(76) Inventors: Gerald A. Foster, P.O. Box 28, Sunnybrook, Alberta (CA) T0C 2M0; Dale W. MacKenzie, P.O. Box 28, Sunnybrook, Alberta (CA) T0C 2M0

( * ) Notice: Subject to any disclaimer, the term of this patent is extended or adjusted under 35 U.S.C. 154(b) by 220 days.

(21) Appl. No.: 11/062,206

(22) Filed: Feb. 18, 2005

(65) Prior Publication Data
US 2005/0197176 A1 Sep. 8, 2005

(30) Foreign Application Priority Data
Feb. 3, 2004 (CA) .................................. 2,459,608

(51) Int. Cl.
*A01F 12/24* (2006.01)
(52) U.S. Cl. ..................................... 460/110
(58) Field of Classification Search ................ 460/110, 460/46, 32, 71, 72, 107, 109, 108, 149; 209/393, 209/395, 394; 56/14.6
See application file for complete search history.

(56) References Cited

U.S. PATENT DOCUMENTS

| | | | | |
|---|---|---|---|---|
| 2,159,664 A | * | 5/1939 | Lindgren | 460/71 |
| 2,361,633 A | * | 10/1944 | Jones | 460/71 |
| 2,457,259 A | * | 12/1948 | Moll | 460/110 |
| 2,457,680 A | * | 12/1948 | Johnson | 460/110 |
| 3,034,513 A | | 5/1962 | Ausherman | |
| 3,256,887 A | | 6/1966 | Ausherman | |
| 3,515,145 A | * | 6/1970 | Herbsthofer | 460/110 |
| 3,734,103 A | * | 5/1973 | Mathews | 460/108 |
| 4,711,075 A | | 12/1987 | Strong | |
| 4,875,891 A | * | 10/1989 | Turner et al. | 460/110 |
| 4,988,326 A | * | 1/1991 | Bennett | 460/110 |
| 5,024,631 A | | 6/1991 | Heidjann et al. | |
| 5,057,056 A | | 10/1991 | Kambeitz | |
| 5,613,907 A | | 3/1997 | Harden | |
| 5,919,087 A | * | 7/1999 | Strong et al. | 460/72 |
| 6,503,142 B2 | * | 1/2003 | Imel et al. | 460/107 |

OTHER PUBLICATIONS

Sunnybrook Welding and Machine Shop Ltd., 'Sunnybrook—Combine Replacement Parts' brochure, as early as 1996.
John Deere, Threshing Components of 'Combine Performance Enhancements' Brochure, as early as Feb. 2002, 4-6.

* cited by examiner

*Primary Examiner*—Árpád Fábián Kovács
(74) *Attorney, Agent, or Firm*—Davis Bujold & Daniels, P.L.L.C.

(57) ABSTRACT

A concave for a combine harvester includes a body consisting of a grid of straight longitudinal bars arranged in a concave configuration. Each of the longitudinal bars have a leading face, a trailing face, and an upper extremity. At least one of the longitudinal bars has a longitudinal cavity positioned along the leading face at the upper extremity. A wear resistant insert is positioned in the longitudinal cavity. The wear resistant insert is detachably secured to and receives underlying support from the said at least one of the longitudinal bars. The wear resistant insert provides a replaceable leading edge.

9 Claims, 2 Drawing Sheets

CONCAVE FOR A COMBINE HARVESTER

This application claims priority from Canadian Application Serial No. 2,459,608 filed Mar. 2, 2004.

FIELD OF THE INVENTION

The present invention relates to a combine harvester having a rotating cylinder in conjunction with a fixed concave.

BACKGROUND OF THE INVENTION

A concave is a grate used to retard material for threshing and for separating grain from material other than grain. The concave is subjected to a lot of wear through abrasion. This abrasion is distributed unevenly across the concave.

U.S. Pat. No. 5,057,056 (Kambeitz 1991) addresses the problem of concave abrasion, by providing angled bars which direct incoming material away from the center of the concave, thereby distributing the wear more evenly.

U.S. Pat. No. 5,613,907 (Harden 1997) teaches the use of a concave having removable grids, which are easily replaceable as they become worn.

SUMMARY OF THE INVENTION

What is required is a concave, which is better suited to deal with abrasion.

According to the present invention there is provided a concave for a combine harvester, which includes a body consisting of a grid of straight longitudinal bars arranged in a concave configuration. Each of the longitudinal bars have a leading face, a trailing face, and an upper extremity. At least one of the longitudinal bars has a longitudinal cavity positioned along the leading face at the upper extremity. A wear resistant insert is positioned in the longitudinal cavity. The wear resistant insert is detachably secured to and receives underlying support from the said at least one of the longitudinal bars. The wear resistant insert provides a replaceable leading edge.

With the concave, as described above, the uneven heavy wear areas are provided with replaceable wear resistant inserts. When the wear resistant inserts become worn, they can readily be replaced, thereby prolonging the useful life of the concave. It is not practical to give an entire concave a boronizing treatment or similar treatment intended to increase wear resistance. However, the wear resistant inserts can readily be subjected to special treatment to further increase their wear resistance.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 2:
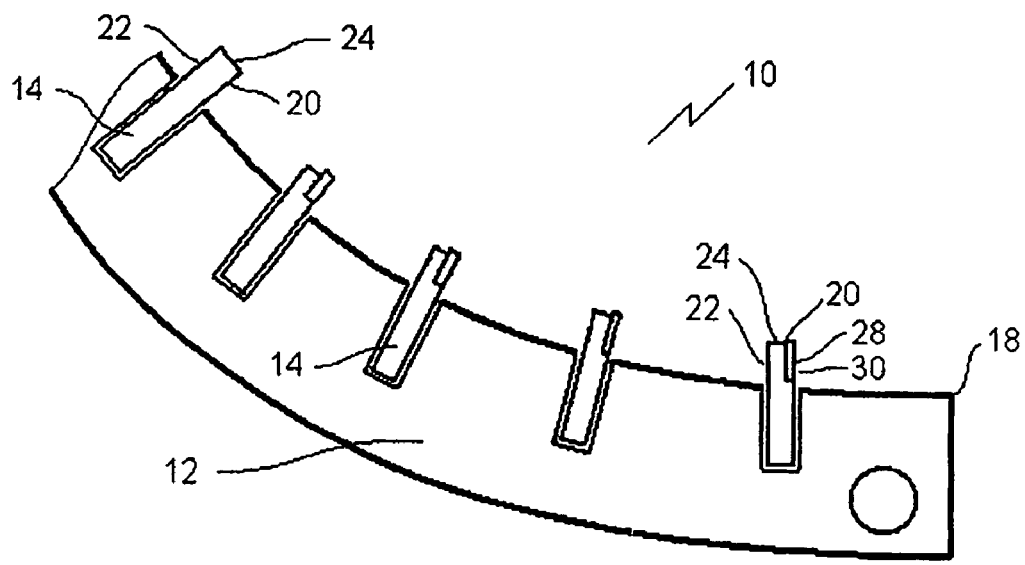
FIG. 2 is a detailed side elevation view of the concave illustrated in FIG. 1.
Figure 3:
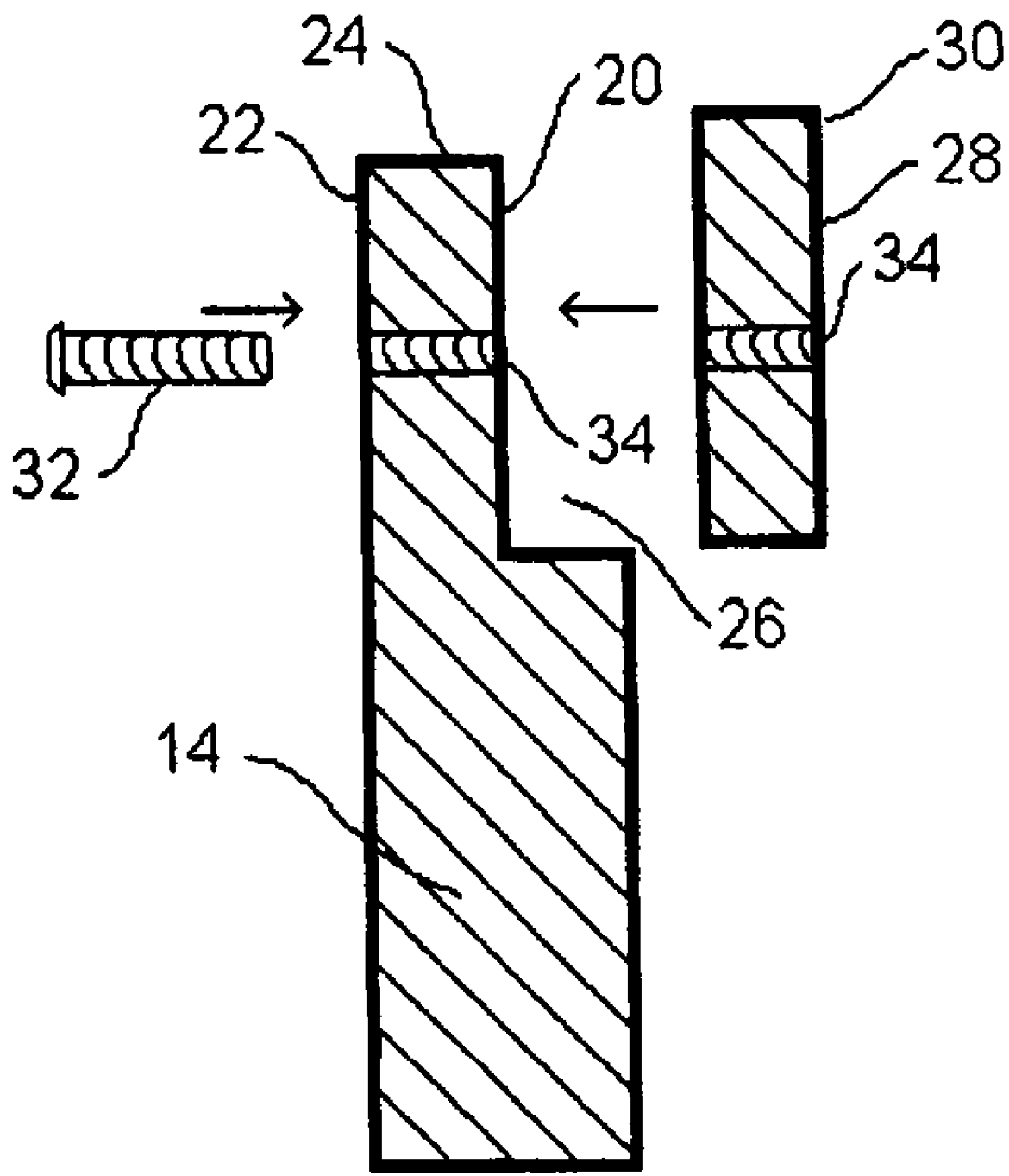
FIG. 3 is a detailed side elevation view in section of a longitudinal bar.

The preferred embodiment, a concave generally identified by reference numeral 10, will now be described with reference to FIGS. 1 to 3.

Figure 1:
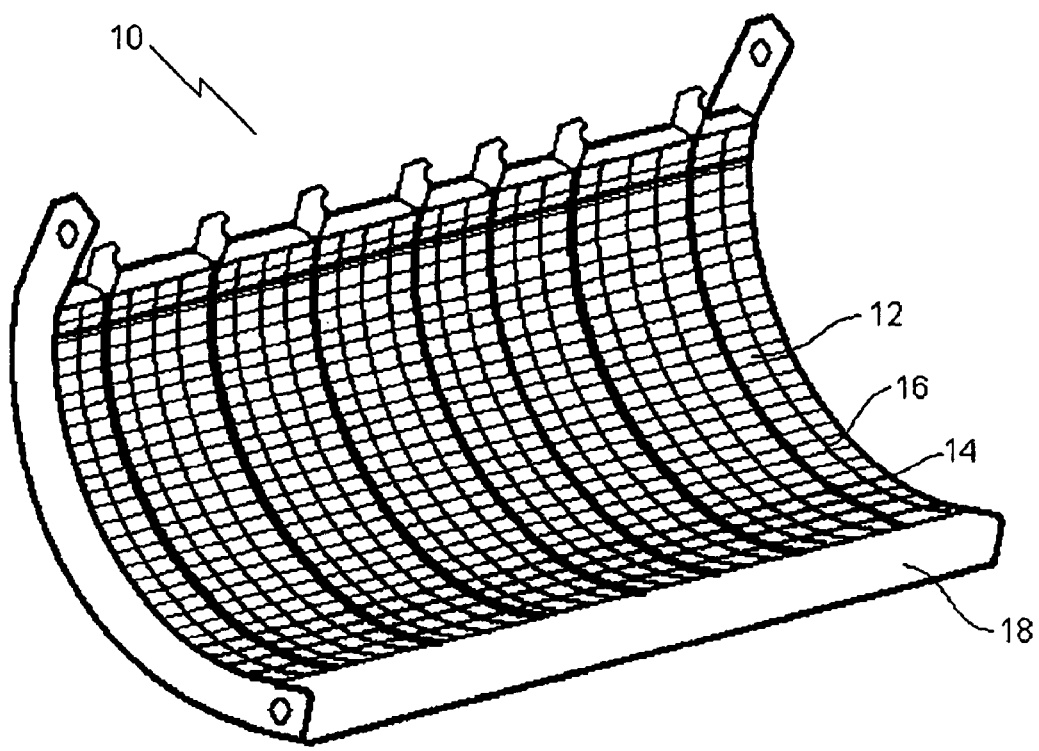
FIG. 1 is a perspective view of a concave for a combine harvester constructed in accordance with the teachings of the present invention.

Structure and Relationship of Parts:

Referring to FIG. 1, there is shown a concave 10 for a combine harvester with a body 12 consisting of a grid of straight longitudinal bars 14 and concave transverse bars 16, and a front edge 18. Referring now to FIG. 2, each longitudinal bar 14 has a leading face 20, a trailing face 22, and an upper extremity 24, where longitudinal bars 14 extend parallel to front edge 18 of body 12. Referring now to FIG. 3 some longitudinal bars have a longitudinal cavity 26 positioned along leading face 20 at upper extremity 24. In each longitudinal cavity 26 is positioned a wear resistant insert 28. As shown, wear resistant inserts 28 are detachably secured to longitudinal bar 14, such that there is a replaceable leading edge 30. As can be seen in FIG. 2, replaceable leading edge 30 protrudes past and protects leading face 20 of longitudinal bars 14. As the majority of the friction is caused at the front of concave 10, as can be seen in FIG. 1, only the first four longitudinal bars 14 are equipped in this way, although, more or fewer longitudinal bars 14 may be installed, depending on the users preference.

Referring again to FIG. 3, wear resistant inserts 28 are secured to longitudinal bars 14 by rotatable fasteners 32, such as screws, or nuts and bolts. Rotatable fasteners 32 extend from trailing face 22 through longitudinal bar 14 into threaded apertures 34 in wear resistant insert 28.

Operation:

Referring to FIG. 1, concave 10 is adapted to be installed on a harvester, which is then used for threshing. Referring now to FIG. 3, when wear resistant inserts 28 become overly worn because of abrasion, they are replaced by removing rotatable fasteners 32 and installing new wear resistant inserts 28.

One of the reasons that wear resistant inserts 28 are able to withstand the considerable forces exerted upon them, is that they are positioned in longitudinal cavity 26 and where they receive underlying support from longitudinal bars 14. If wear resistant inserts 28 were to be secured to leading face 20 without such underlying support, all of the force would be borne by fasteners 32. With such an installation, the force that wear resistant inserts 28 could withstand would be limited to the shear force rating of fasteners 32. The purpose of cavities 26 is to ensure that wear resistant inserts 28 receive underlying support.

The types of fasteners used with wear resistant inserts 28 is not critical. Rotatable fasteners have been illustrated merely because they are preferred. Similarly, whether the fasteners extend in from trailing face 22, leading face 20, or extend completely through longitudinal bars 14 is not critical. Extending in from trailing face 22 is preferred merely because it reduces clogging of material into the tool receptacle in the head of fasteners 32 into which a screw driver is inserted when removing fasteners 32 for replacement of wear resistant inserts 28.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

The embodiments of the invention in which an exclusive property or privilege is claimed are defined as follows:

1. A concave for a combine harvester, the concave comprising:
    a body consisting of a grid of straight longitudinal bars arranged in a concave configuration, and each of the longitudinal bars having a leading face, a trailing face, and an upper extremity;
    at least one the longitudinal bars having an integrally formed longitudinal cavity positioned along the leading face at the upper extremity thereof; and
    a wear resistant insert positioned in the longitudinal cavity, the wear resistant insert being detachably secured against the leading face and receiving underlying support along a majority of the wear resistant insert from said at least one of the longitudinal bars thereby providing a replaceable leading edge.

2. The concave as defined in claim 1, wherein the longitudinal bars are maintained in a concave configuration by concave transverse bars.

3. The concave as defined in claim 1, wherein the body has a front edge and more than one of the longitudinal bars, extending parallel to the front edge of the body has the longitudinal cavity with the wear resistant insert.

4. The concave as described in claim 1, wherein the wear resistant insert is secured to the longitudinal bar by rotatable fasteners.

5. The concave as described in claim 4, wherein the rotatable fasteners extend from the trailing face through the longitudinal bars into threaded apertures in the wear resistant insert.

6. The concave as defined in claim 1, wherein the wear resistant insert protrudes past and protects the leading face of the longitudinal bars.

7. A concave for a combine harvester, the concave comprising:
    a body consisting of a grid of straight longitudinal bars and concave transverse bars, each of the longitudinal bars having a leading face, a trailing face, and an upper extremity, and the body having a front edge;
    more than one of the longitudinal bars extending parallel to the front edge of the body having an integrally formed longitudinal cavity positioned along the leading face at the upper extremity; and
    a wear resistant insert position in each longitudinal cavity, the wear resistant insert being detachably secured against the leading face and receiving underlying support along a majority of the wear resistant insert from the longitudinal bar thereby providing an replaceable leading edge, and the replaceable leading edge protruding past and protecting the leading face of the longitudinal bars.

8. The concave as defined in claim 7, wherein the wear resistant insert is secured to the longitudinal bar by rotatable fasteners.

9. The concave as defined in claim 8, wherein the rotatable fasteners extend from the trailing face through the longitudinal bars into threaded apertures in the wear resistant insert.

* * * * *